US012587036B2

(12) United States Patent
Harrison

(10) Patent No.: US 12,587,036 B2
(45) Date of Patent: Mar. 24, 2026

(54) INVERTER

(71) Applicant: Energy Research Lab Ltd, London (GB)

(72) Inventor: Lee Harrison, Wilstead (GB)

(73) Assignee: QBYSS Ltd., London (GB)

( * ) Notice: Subject to any disclaimer, the term of this patent is extended or adjusted under 35 U.S.C. 154(b) by 335 days.

(21) Appl. No.: 18/161,403

(22) Filed: Jan. 30, 2023

(65) Prior Publication Data

US 2023/0231494 A1 Jul. 20, 2023

Related U.S. Application Data

(63) Continuation of application No. PCT/GB2021/051996, filed on Aug. 2, 2021.

(30) Foreign Application Priority Data

Jul. 31, 2020 (GB) ..................................... 2011928
Jul. 31, 2020 (GB) ..................................... 2011935
Jul. 31, 2020 (GB) ..................................... 2011969

(51) Int. Cl.
*H02M 7/48* (2007.01)
*H02J 3/34* (2006.01)
(Continued)

(52) U.S. Cl.
CPC ................ *H02J 50/10* (2016.02); *H02J 3/34* (2013.01); *H02M 1/007* (2021.05);
(Continued)

(58) Field of Classification Search
CPC .... H02M 1/4208; H02M 1/4241; H02M 3/01; H02M 3/015; H02M 7/4811; H02M 7/4815; H02M 7/4818; H02M 7/4826
See application file for complete search history.

(56) References Cited

U.S. PATENT DOCUMENTS 5,907,223 A * 5/1999 Gu ........................ H02M 5/225
315/307
2004/0130916 A1 7/2004 Baarman
(Continued)

FOREIGN PATENT DOCUMENTS

CN 106160451 A 11/2016
CN 106059364 B 11/2018
(Continued)

OTHER PUBLICATIONS

GB2011928.5 Combined Search and Exam Report dated Jan. 29, 2021.
(Continued)

*Primary Examiner* — Gary A Nash
(74) *Attorney, Agent, or Firm* — Woodard Emhardt Henry Reeves & Wagner LLP

(57) ABSTRACT

There is provided a high frequency AC inverter comprising a DC-DC circuit, an output power circuit and a load circuit and a controller, the load circuit comprising a load circuit detector configured to detect the electrical parameters of the load circuit. The output power circuit comprises a DC to AC driver having a variable frequency output, a HFAC driver circuit comprising a resonant network and a transformer coupled to the HFAC driver circuit and the load circuit. The controller is configured to control the output frequency of the DC to AC driver and the output of the DC to DC circuit in response to the detected electrical parameters of the load circuit.

20 Claims, 8 Drawing Sheets

(51) Int. Cl.

| | |
|---|---|
| *H02J 50/10* | (2016.01) |
| *H02M 1/00* | (2006.01) |
| *H02M 1/42* | (2007.01) |
| *H02M 3/00* | (2006.01) |
| *H02J 50/40* | (2016.01) |
| *H02M 3/335* | (2006.01) |

(52) U.S. Cl.
CPC .......... *H02M 7/4815* (2021.05); *H02J 50/40* (2016.02); *H02J 2310/12* (2020.01); *H02M 1/4208* (2013.01); *H02M 1/4241* (2013.01); *H02M 3/01* (2021.05); *H02M 3/015* (2021.05); *H02M 3/33569* (2013.01); *H02M 7/4811* (2021.05); *H02M 7/4818* (2021.05); *H02M 7/4826* (2013.01)

(56) References Cited

U.S. PATENT DOCUMENTS

| | | | |
|---|---|---|---|
| 2006/0132104 A1* | 6/2006 | Li | ............................ G05F 1/70 |
| | | | 323/207 |
| 2011/0299313 A1 | 12/2011 | Hussmann | |
| 2012/0306286 A1 | 12/2012 | Kim et al. | |
| 2014/0225439 A1 | 8/2014 | Mao | |
| 2014/0354073 A1 | 12/2014 | Sadakata | |
| 2015/0130294 A1 | 5/2015 | Suzuki et al. | |
| 2015/0198634 A1 | 7/2015 | Brinlee | |
| 2018/0090990 A1 | 3/2018 | Enami | |
| 2019/0157898 A1 | 5/2019 | Herbst et al. | |
| 2019/0157980 A1* | 5/2019 | Ji | ...................... H02M 3/33592 |
| 2019/0363582 A1 | 11/2019 | Mao et al. | |
| 2020/0014245 A1* | 1/2020 | Costinett | ............. H02M 7/5387 |
| 2020/0177028 A1* | 6/2020 | Esteban | .................. H02J 50/12 |

FOREIGN PATENT DOCUMENTS

| | | |
|---|---|---|
| EP | 2880740 A1 | 6/2015 |
| EP | 2928038 A1 | 10/2015 |
| NZ | 535012 A | 11/2006 |
| WO | WO 2019/164398 A1 | 8/2019 |

OTHER PUBLICATIONS

GB2011935.0 Combined Search and Exam Report under Sections 17 & 18(3) dated Jan. 29, 2021.

GB2011969.9 Combined Search and Exam Report dated Jan. 29, 2021.

He Qingqing et al, Analysis and Design of a Single-Stage Bridgless High-Frequency Resonant AC/AC Converter, IEEE Transactions on Power Electronics, Inst. of Elec. & Elec. Eng., USA, vol. 34 No. 1, Jan. 1, 2019, p. 700-711.

International Search Report and Written Opinion in PCT/GB2021/051992.

International Search Report and Written Opinion in PCT/GB2021/051994.

International Search Report and Written Opinion in PCT/GB2021/051996.

Mao et al., Unified Equivalent Steady-State circut Model and Comprehensive Design of the LCC Resonant converter for HV Generation Architectures, IEEE Transactions on Power Elec. vol. 33, No. 9, Sep. 2018.

Current-Fed High-Frequency AC Distributed Power System for Medium-High-Voltage Gate Driving Applications, Wen et al., IEEE Transactions on Ind. Elec., vol. 60 No. 9, Sep. 2013.

* cited by examiner

INVERTER

CROSS-REFERENCE TO RELATED APPLICATIONS

This application is a continuation of PCT/GB2021/051996 filed Aug. 2, 2021, which claims the benefit of GB2011928.5 filed Jul. 31, 2020; GB2011969.9 filed Jul. 31, 2020; and GB2011935.0 filed Jul. 31, 2020, which are hereby incorporated by reference.

The invention relates to a power distribution system for distributing variable high frequency alternating current (HFAC) via a cabled bus system, in particular a power distribution system whereby operating parameters of the distributed HFAC output supply are automatically controlled. The HFAC distributed bus powers devices connected to the power distribution bus cables.

Conventional electrical mains distribution systems and the grid as we know it usually supply electricity at 90-264V AC at a frequency 47-63 Hz, depending on the jurisdiction. Electrical products are connected to the grid using a variety of hard-wired connectors or junction boxes. Standard mains voltage is known to be potentially hazardous to work on due to the frequency of 47-63 Hz and the effect this frequency can have on the human body. All connections to an installation with the exception of plugging in appliances with traditional country specific mains plugs require the expertise of qualified and agency approved electricians.

Furthermore, AC power presents a danger of electrocution, which is exacerbated in wet conditions or where there is exposed or damaged cabling. When providing power in outside environments, for example, communal play areas, gardens, swimming pools, around ponds, parks and elsewhere, additional safety procedures must be legally followed, for example, IP6x waterproof junction boxes, the use of armoured cables and resin filled connector blocks. Not only can this be notoriously difficult and time consuming, but it has to be professionally installed by qualified electricians and carries a potential electrical shock risk to people and other life and fire risk to property in the event of a fault or damage.

Increasing the frequency of the AC supply above 20 kHz from a current controlled AC to AC inverter provides a safe alternative to traditional, dangerous low frequency AC voltage power distribution, providing a system whereby appliances may be connected to the HFAC bus cable inductively, taking the improved safety aspect one step further as the power/load circuit is inductively coupled to a HFAC power supply. High frequencies, typically in excess of 20 kHz are used so that efficient inductive power transfer may take place.

As electrical devices and components are inductively powered by the HFAC bus cables, installation is quicker and simpler and furthermore does not carry the same risks of electrocution or fires caused by arcing connectors in any condition, especially wet environments.

Inductively coupled loads and power supplies using high frequency AC are known and have been in use for some time. For example, NASA trailed HFAC in the 1980s during experiments for the space station. As a further example, U.S. Pat. No. 4,264,827 describes a power cable that uses a twisted wire pair which is short circuited at both ends. To couple to the bus transformer core elements are connected to the twisted wire pair so that the wires form a single turn transformer winding about each of two legs of the core elements. An output winding suitably placed on the core element of the cable driver will be inductively coupled to the twisted wire pair and can be used to draw power for a load. The core elements which connect through the twisted wire are formed by two parts which can be formed as a U-I shape, an E-I shape, U-U shape or E-E shape with the 'legs' of the U or E being inserted between twists of the twisted wire pair cable. The device of U.S. Pat. No. 4,264,827 was designed for aviation use as a way of providing power to various locations of an aircraft without galvanic connections. In other contexts, there are various disadvantages, including the use of a relatively high voltage as the power supply.

Known HFAC power distribution systems use a constant current mode of operation which can cause the output voltage, which is proportional to load, to be high as the load increases. This can compromise the safety as high voltage HFAC can cause burns. It is not uncommon to generate over 400V AC output voltage in these typical HFAC systems. More importantly, these systems too may become dangerous in wet areas, especially during fault conditions, due to the constant current mode of operation. During fault conditions they are able to supply a constant current directly into the faulty circuit, causing thermal failure modes where temperatures have been witnessed to be high enough to melt cables, plastic enclosures and ceiling tiles, setting off smoke detectors, tripping circuit breakers and putting buildings into darkness. Due to the nature of these traditional constant current systems, in the event of a faulty load the main HFAC power supply will continue to drive the faulty load at high current until the inevitable thermal runaway that follows causes complete failure. These previous HFAC systems are traditionally controlled by hard wired control systems, have limited if any user interface to control the power supplies and have been used in the main for small scale lighting applications.

WO 2010/106375 provides another example of a cabled power distribution system for high frequency AC, which again uses a constant current HFAC as the main power supply. In this case the power distribution system is designed for use with mains electricity as the input power and for supplying power to a lighting system, in particular to a lighting system using LEDs. An output cable in the form of a twisted wire pair is used in a fashion similar to U.S. Pat. No. 4,264,827, with inductively coupled loads being attached to the twisted wire pair via a transformer type arrangement, which is again similar to that disclosed in U.S. Pat. No. 4,264,827. This system effectively adopts the same basic principles as U.S. Pat. No. 4,264,827 to provide power for domestic installations and similar lighting systems, but systems with a potential for very high AC voltages at 50 kHz with peak currents exceeding safe limits can be potentially dangerous, especially in fault conditions. Should the output cable become disconnected, dangerous voltages at high frequency introduce a burn risk as well as an electric voltage shock risk, causing connected loads to be damaged by excessively uncontrolled high voltages.

Conventional HFAC products operate at a fixed constant current and fixed frequency and, beginning at cable lengths as short as 50 m, standing wave problems have been identified by the inventors. As the cable length increases, the HFAC output waveform is progressively degraded. The issue is exacerbated by progressively higher loads. This causes poor current regulation and overdriving of inductively connected devices as the peak currents in the HFAC cable increase in line with the rise in standing wave elements. The effect of THD (total harmonic distortion) and standing waves cause HFAC power supplies to deliver higher current, voltage and power than is safe to do so. Some prior art systems designed to operate at a fixed constant current have been seen to lose control of their current regulation when the loads are varied or increased, for example, as lighting is taken from a low dimmed state to full brightness, or as cable lengths are increased. Dangerous system conditions can result in which increases in current, to more than 75% of their intended designed operating condition, have been seen.

The loss of current regulation worsens significantly as output cables reach and exceed 120M in length due to superimposed standing waves on the distributed bus and as the subsequent noise on the HFAC power bus increases. The current regulation has been seen to degrade to a point whereby the HFAC inverter sine wave output waveform is heavily distorted and only vaguely resembles a sine wave. Additionally, individual devices connected inductively will have been designed and specified to run at a safe rating. For example, a LED may be designed to run at 700 mA and may be configured to do so (via a transformer) while being powered by a power bus operating at a typical 1.5 A in prior art examples. However, when the control of the current of the operating bus is lost and the current increases to circa 3 A, the LED will operate at approximately 1200 mA. Powering any device above its maximum rating will reduce the life of the device considerably. Driving LEDs above their maximum rating will shorten the life of the LED considerably, whilst at the same time shortening the life of the HFAC driver and the HFAC converter as both will be operating almost 67% above their designed operating points. In the case of lighting systems, every light fitted to the HFAC bus will be overdriven, eventually leading to premature system failures. In the past these have caused thermal system failures with catastrophic end results in which devices connected to the HFAC bus slowly overheat causing them to melt undetected in ceiling spaces before they eventually fail, causing noxious odours and potential for smoke damage to buildings. These performance issues in prior art systems are mitigated by reducing distributed bus cable lengths and or reducing the maximum load they can support.

Prior art examples of HFAC distribution systems operate at a constant fixed frequency and a constant fixed current over their complete load curve and cable length. In typical prior art examples, adjustable frequency is not possible as any change in frequency results in large changes to output power The frequency is determined by the switching frequency of the half bridge and the characteristics of a quasi-resonant tank circuit. The Q factor is determined by standard passive component capacitor and inductor component values that form the resonant tank. For example, considering the prior art example discussed in WO 2010/106375, this has a fixed frequency of 50 kHz. The resonant tank consists of an inductor and capacitor that can both vary in tolerance due to component manufacturing tolerances, up to +/−25% for inductors and from +/−5% to +/−10% for the capacitors.

Although prior art systems are often designed to distribute HFAC at 50 kHz the resonant frequency due to previously forementioned component tolerances may lie anywhere between 36 kHz and 56 kHz. As each component may have different values (due to these tolerances between power supplies) it is unlikely that any two power supplies across different batches will be the same. Some will run below at or above resonance, but each will be different, and each will vary as the high voltage components in the resonant tank drift with age. These systems require careful setup in production to manually adjust the frequency to 50 kHz.

The inventors have realised a further significant drawback of prior art systems such as those defined in WO 2010/

106375 is that of power consumption in standby conditions. Systems such as these when in standby continue to supply the full current to the distributed bus at 50 kHz. Some of these systems, rated to only 500 W of output power when running at full load have been seen to consume circa 80 W when in a standby condition, for example all lights off but power supply still distributing the HFAC bus current. As building installations could expect multiple power supplies of these types fitted in many areas, those standby losses become additive. It is not unrealistic for a block of apartments for example to use one (or more per apartment). A block of 50 apartments could be seen to consume circa 80 W×50=4,000 W with all the lighting turned off. At a time when energy conservation has never been so important this is a very important aspect to address in HFAC Power Distribution.

The inventors have therefore summarised that the mode of operation employed in prior art HFAC Power Distribution systems consisting of a fixed output frequency, fixed duty cycle and fixed output current across all operating conditions has many drawbacks, some of which have prevented large scale adoption. Individual systems and installations will have differing cable lengths, differing loads, either of which may even be added to or subtracted from as building modifications adapt to changes of use where said loads can vary in power from 0 to 100%.

Furthermore, known HFAC systems are relatively simple in their operation, allowing minimal user control with little or no indication of status, fault conditions, power level etc. and no connection to building management systems, fire systems, security systems or the internet for safety control. More importantly, the inventors have found that some of the prior art examples may fail in an unsafe manner, causing burn risks in addition to electric shock risk. Prior art systems consist of various elements, but fundamentally, single outputs with twisted pair cables for carrying the HFAC power.

It is therefore an object of the invention to provide a power distribution system which overcomes these problems.

According to the invention there is provided a high frequency AC inverter comprising a DC-DC circuit, an output power circuit and a load circuit and a controller, the load circuit comprising a load circuit detector configured to detect the electrical parameters of the load circuit, the output power circuit comprising a DC to AC driver having a variable frequency output, a HFAC driver circuit comprising a resonant network; and a transformer coupled to the HFAC driver circuit and the load circuit, wherein the controller is configured to control the output frequency of the DC to AC driver and the output of the DC to DC circuit in response to the detected electrical parameters of the load circuit. This enables the power on the load circuit to be controlled in accordance with the detected load.

Controlling the output frequency of the DC to AC driver in response to the detected electrical parameters of the load circuit may comprise, in response to a detected reduced load on the load circuit, increasing the frequency output of the DC to AC driver and decreasing the DC to DC output and, in response to a detected increased load on the load circuit, reducing the frequency output of the DC to AC driver and increasing the DC to DC output.

The invention provides a power distribution bus for a HFAC system.

The system may comprise an input detector configured to detect the electrical parameters of the input to the high frequency AC inverter. The input detector may be positioned at the input to the DC to DC circuit (if there is a DC input) or at the input to a PFC (if an AC input). Detecting the electrical parameters may comprise detecting one or more of the current, voltage or power of the input.

Controlling the output frequency of the DC to AC driver and the output of the DC to DC converter may comprise determining the optimum frequency and optimum DC to DC output for maximum efficiency for the detected load and controlling the frequency output of the DC to AC driver and the output of the DC to DC circuit according to the optimum frequency and optimum DC to DC output.

The optimum frequency and the optimum DC to DC output for maximum efficiency are stored in a look up table in the controller. The look up table may include factors such as the length of the load circuit cable and the resonant frequency of the resonant network.

The output frequency of the DC to AC driver may be adjusted in response to standing waves being detected on the load circuit.

The input to the high frequency AC inverter may be a DC supply or an AC supply. If the input is an AC supply the system may further comprise a PFC circuit. The PFC circuit may be a bridgeless power factor correction circuit.

Detecting the electrical signal of the load circuit comprises detecting one or more of the voltage of the load circuit, the current of the load circuit, the frequency of the load circuit the power of the load circuit or the distortion of the load circuit.

The controller may comprise a digital signal processor and may the controller be controllable through RF, encrypted RF, Bluetooth or WiFi devices.

The load circuit may comprise a pair of side by side wires and has a variable frequency of 10 kHz to 150 kHz. The system may further comprise one or more peripheral devices inductively coupled to the load circuit, and powered by the high frequency AC power supply.

The input frequency of the power circuit may be between 10 Hz and 500 Hz.

According to the invention there is provided a high frequency AC inverter comprising a DC-DC circuit having a variable output, an output power circuit and a load circuit and a controller, the load circuit comprising a load circuit detector configured to detect the electrical parameters of the load circuit and the output power circuit comprising a DC to AC driver having a variable frequency output, a HFAC driver circuit comprising a resonant network and a transformer coupled to the HFAC driver circuit and the load circuit, wherein the controller is configured to control the output of the DC to DC circuit to control the current on the load circuit to maintain it within a predetermined range.

The controller is configured to increase the variable output of the DC to DC circuit in response to a detected increased load on the load circuit and to decrease the output of the DC to DC circuit in response to a detected reduced load on the load circuit. The controller is configured to keep the load circuit within a current range of 1.5-2.5 A.

There may be a PFC circuit which has a variable output. The controller may be configured to control the output of the PFC circuit in response to the electrical parameters of the load circuit.

A high frequency AC inverter comprising a DC-DC circuit, an output power circuit and a load circuit and a controller, the load circuit comprising a load circuit detector configured to detect the electrical parameters of the load circuit and the output power circuit comprising a DC to AC driver having a variable frequency output, a HFAC driver circuit comprising a resonant network resonant network comprises a first resonant tank, a second resonant tank and a third resonant tank, the first resonant tank comprising a series LC circuit and having a first resonant frequency, the second resonant tank comprising a parallel LC circuit and having a second resonant frequency, a third resonant tank comprising first part having a parallel LC circuit having a third resonant frequency and a second part having a series inductor, wherein the first resonant frequency, the second resonant frequency and the third resonant frequency are the same, and a transformer coupled to the HFAC driver circuit and the load circuit.

The series inductor of the third resonant tank serves to change the phase The inductance of the series inductor of the second part of the third resonant tank is less than the inductance of the inductor of the LC circuit of the first part of the third resonant tank. Alternatively the inductance of the second part of the third resonant tank could be greater than the inductance of the LC circuit.

Above the first resonant frequency the first resonant tank is inductive, and the voltage leads the current by 90° ($\pi$/2) and at frequencies below the first resonant frequency the first resonant tank is capacitive, and the current leads the voltage by 90° ($\pi$/2).

Above the second resonant frequency the second resonant tank is capacitive, and the current leads the voltage by 90° ($\pi$/2) and at frequencies below the second resonant frequency the second resonant tank is capacitive, and the voltage leads the current by 90° ($\pi$/2).

Above the third resonant frequency the first part of the third resonant tank is capacitive, and the current leads the voltage by 90° ($\pi$/2) and at frequencies below the third resonant frequency the first part of the third resonant tank is inductive, and the voltage leads the current by 90° ($\pi$/2).

The inductor that forms the second part of the third resonant tank causes the voltage to lead the current by 90° ($\pi$/2). At resonance all three resonant tanks have equal capacitive and inductive reactance and opposite in sign. Therefore, they cancel each other. Operation above or below resonance increases or decreases the capacitive and inductance reactance through the three resonant networks, maintain clean output waveforms at all loads and cable lengths.

According to the invention there is provided a method of controlling the current on a load circuit of a high frequency AC inverter, the high frequency AC inverter comprising a DC-DC circuit, an output power circuit, a load circuit, the output power circuit comprising a DC to AC driver having a variable frequency output, a HFAC driver circuit comprising a resonant network and a transformer coupled to the HFAC driver circuit and the load circuit, the method comprising detecting the electrical parameters of the load circuit and controlling the output frequency of the DC to AC driver and the output of the DC to DC circuit in response to the detected electrical parameters of the load circuit.

According to the invention there is provided a method of controlling the current on a load circuit of a high frequency Ac inverter, the high frequency AC inverter comprising a DC-DC circuit, an output power circuit, a load circuit, the output power circuit comprising a DC to AC driver having a variable frequency output, a HFAC driver circuit comprising a resonant network and a transformer coupled to the HFAC driver circuit and the load circuit, the method comprising detecting the electrical parameters of the load circuit and controlling the output frequency of the DC to AC driver and the output of the DC to DC circuit in response to the detected electrical parameters of the load circuit.

According to the invention there is provided a computer program configured to instruct a high frequency AC inverter to carry out a method as described above.

The inventors have realised that digital power and digital control whereby HFAC Power Distribution Power Supplies can adjust their HFAC bus frequency, duty cycle and output current in real time dependent upon cable lengths, loads connected, and output power variations, (for example, a lighting system fully dimmed (minimum power) to maximum brightness (maximum power)) is the preferred method of adoption, providing power distribution systems that can respond quickly to load changes, automatically operate at any frequency output current within a specified range, below resonance, at resonance or above resonance, optimised for each given mode of operation.

The inventors have realised many of the issues facing prior art systems as described above are more closely linked to the output frequency of the distributed bus and its relationship to the point of resonance of the resonant tank frequency than previously identified. Thus at certain loads and cable lengths a change in output frequency needs to be adopted which further enables the adjustment relative to the point of resonance to be possible. This enables accurate output current control for one of two reasons. The digital system described with a HFAC output current operating at circa 2.1 A at 65 kHz output frequency will output circa 800V peak to peak voltage (282V RMS HFAC). Assuming no adjustments other than an adjustment of switching frequency increasing to 90 kHz, the output current will drop to circa 1.9 A, peak to peak voltage will reduce to 720V (254VRMS HFAC), but more importantly, loads, (for example lighting), connected to the HFAC bus and driven by HFAC as opposed to DC rectification will be driven harder at this higher frequency due to the frequency of the HFAC output, 90 kHz versus 65 kHz. The increase in frequency delivers more power to the loads. Therefore, the system can either increase the output current to maintain 2.1 A at 90 kHz effectively increasing the output power of the power supply, or decrease the output current to maintain output power to that before the frequency was increased from 65 kHz. This decision is made by either the user or the system configurator as the decision depends on the type and rating of the loads connected to the bus. The user may select constant or variable power control. Constant power control will decrease current if frequency rises and vice versa. Variable power control will maintain the operating current of 2.1 A irrespective of the frequency up to the maximum output power limit of the system. 2.1 A is used as an example. Test data has shown that in addition to control and adjustment in real time of output frequency and current, clean HFAC waveforms can be maintained across long cable lengths and variable load conditions as the power supply adjusts to resonant operation below, at or above resonance during different modes of operation, for example, cable lengths and changes in load.

DESCRIPTION OF THE PREFERRED EMBODIMENT

Figure 1A:
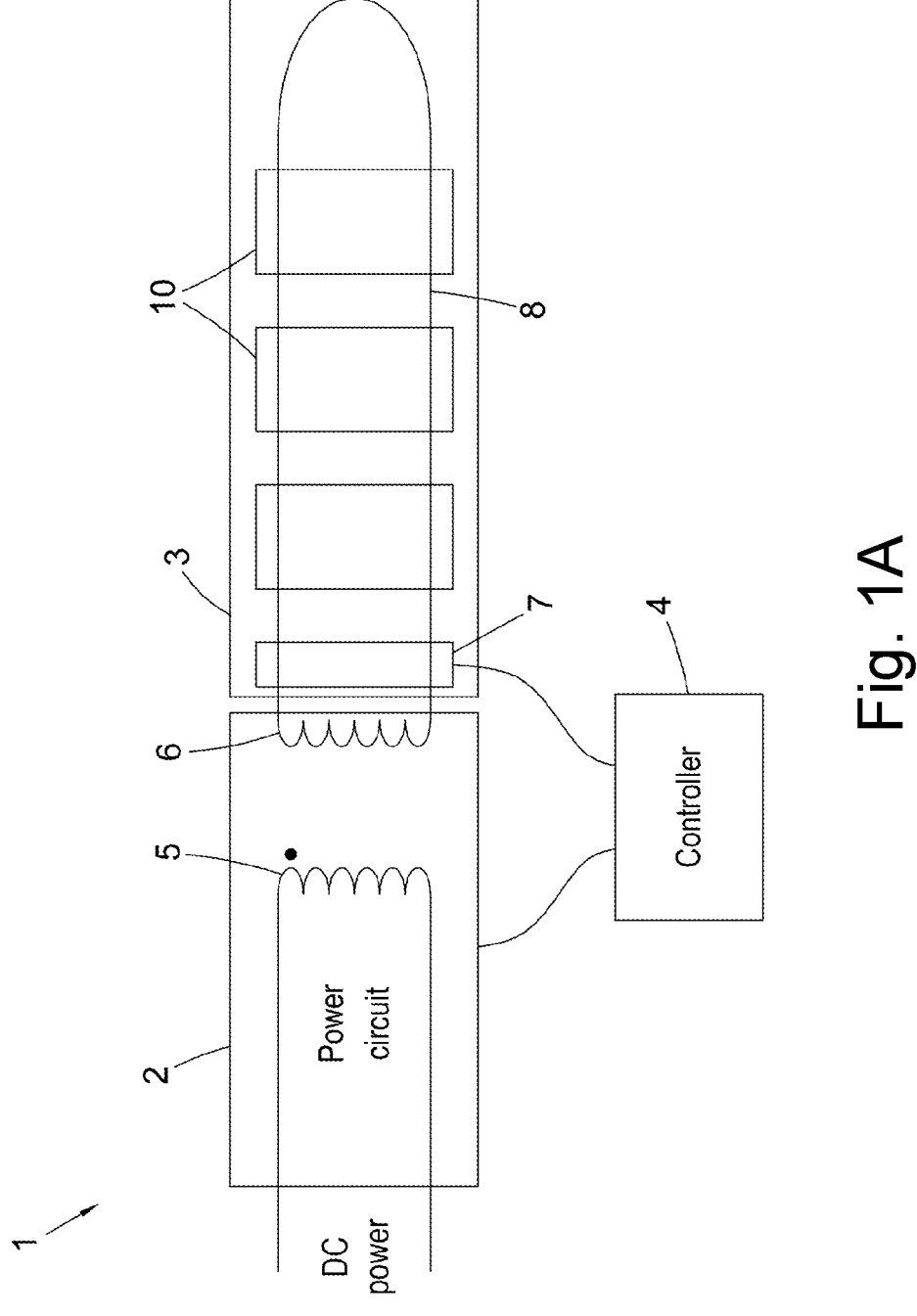
FIG. 1A depicts an inverter according to an embodiment of the invention and configured to convert power from DC to HFAC.

FIG. 1A of the accompanying drawings depicts a power distribution system 1 according to an embodiment of the invention. The power distribution system comprises a power circuit 2, a controller 4 and a load circuit 3. The input power is from an DC source. The input power is supplied to the power circuit which then modifies the electrical waveform. The power circuit comprises a transformer which is coupled to the load circuit by a transformer with the primary 5 of the transformer and a secondary 6 of the transformer. The load circuit comprises a power bus 8 which is formed by a loop of insulated wire. The wire of the loop may be arranged as side by side wires and does not need to be twisted. Along the power bus are a plurality of device drivers 10 for peripheral devices. The peripheral devices may be, for example, lights, sensors, battery chargers, audio devices, cameras, irrigation devices, motors. Arranged on the load circuit is also a load detector 7 which is used to detect parameters of the electrical signal on the power bus. The load detected may detect one or more of the current, the voltage, the power, the frequency, noise and/or the waveform on the power bus. The load detector transmits details of the electrical signal to the controller 4 which then controls variables of the power circuit to ensure that the electrical signal on the load circuit remains stable and within acceptable boundaries ensuring optimal performance under all load and line conditions. The load detector may be connected to the controller either by a wire or wirelessly and may be built into the power supply. The controller may be a digital signal processor (DSP), a microcontroller or a FPGA.

In addition to being in communication with the load detector 7 the controller 4 may be controlled by a user wirelessly using RF, encrypted RF, Bluetooth or WiFi devices. The user may be able to specify operating conditions such as operating frequency and power levels.

Figure 1B:
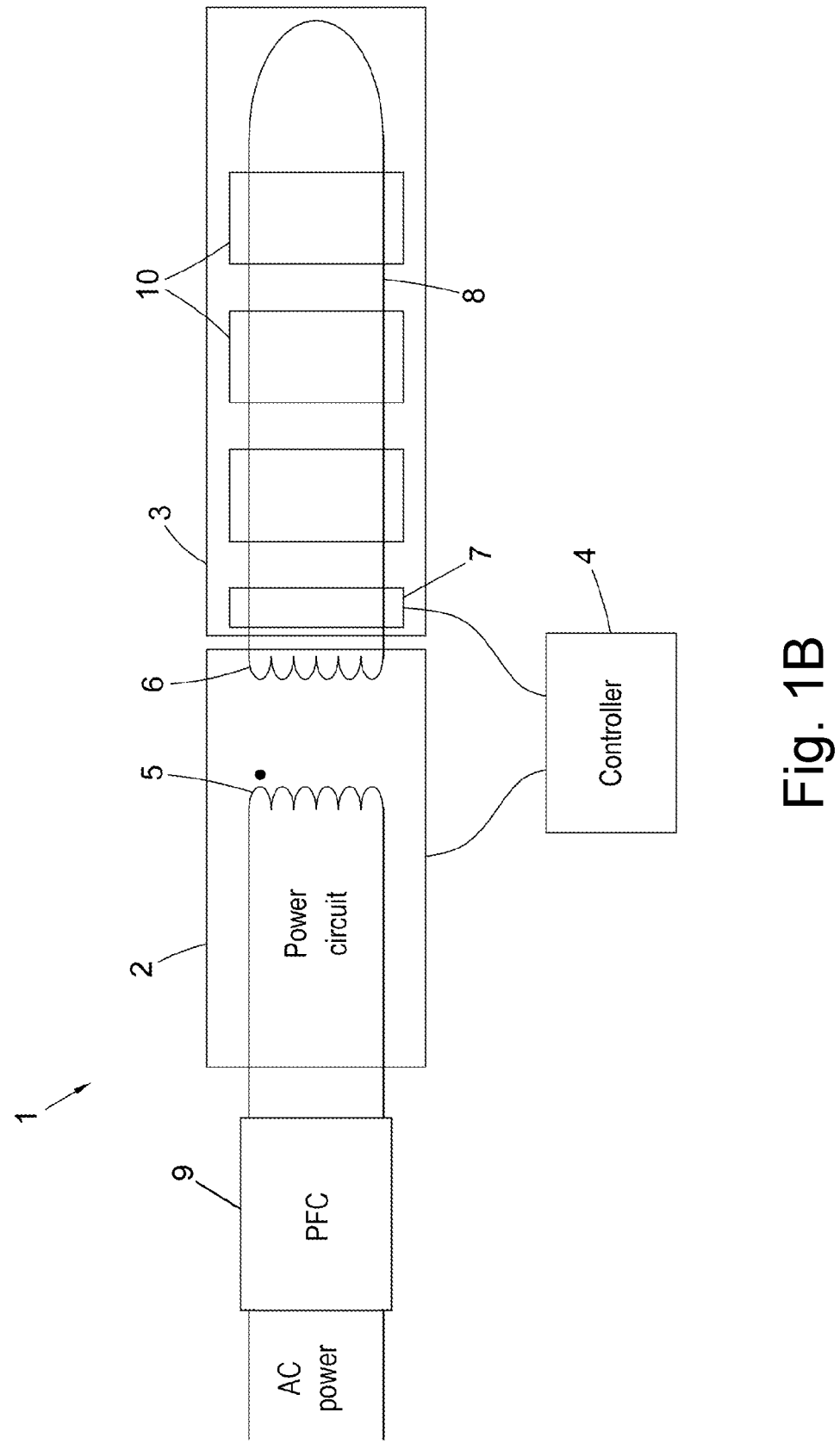
FIG. 1B depicts an inverter configured to convert power from AC to HFAC.

FIG. 1B depicts an arrangement similar to that depicted in FIG. 1A but arranged to convert AC power to HFAC. In this embodiment there is a PFC (power factor correction) 9 arranged to convert the AC power to DC. The output DC voltage from the PFC is in the range 360-440V. The PFC is preferably a digital bridgeless totem pole PFC. Aside from the PFC the arrangement of the inverter is the same as that depicted in FIG. 1A.

Figure 2:
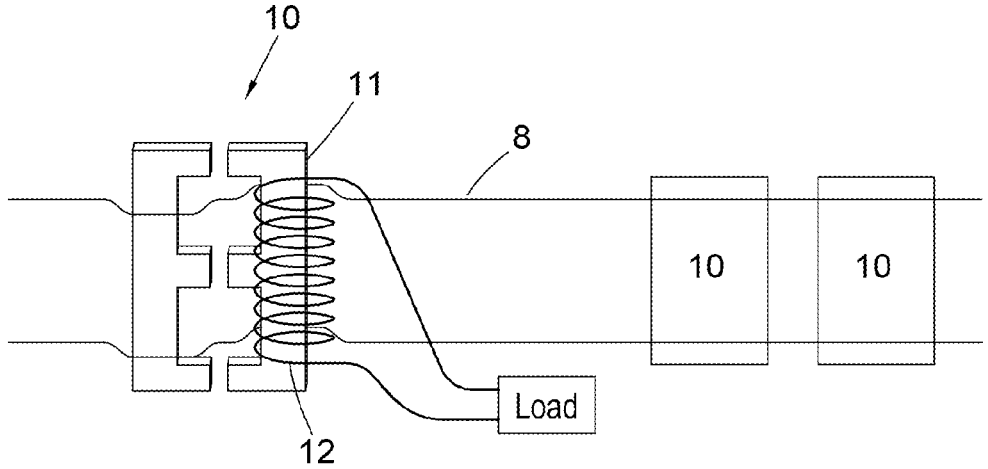
FIG. 2 depicts a device driver coupled to a power bus of a load circuit.

FIG. 2 depicts a device driver 10 according to the invention inductively coupled to the power bus 8. The power bus provides the primary coupling and a coil of wire 12 provides the secondary coupling. To concentrate the magnetic flux an ferrite core 11 forms a loop around a portion of the power bus and through the centre of the coil of wire 12. The current induced in the wire coil 12 is used to power a peripheral device.

Figure 3:
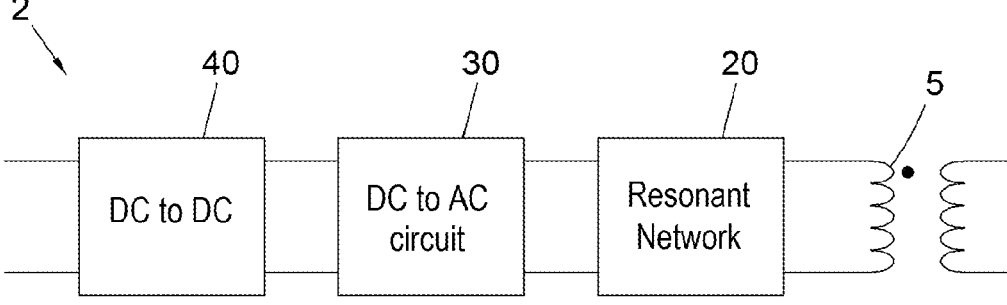
FIG. 3 depicts a schematic diagram of the power circuit according to an embodiment of the invention.

FIG. 3 depicts a power circuit 2, or supply, according to an embodiment of the invention. In this example the power supply is fed by DC, for example 200-400V. The power is input into a DC to DC converter which outputs a voltage at a desired level. Coupled to the DC to DC circuit is a DC to AC converter 30 which outputs a variable frequency square wave. The DC to AC converter outputs a square wave from the half or full bridge which is fed to the resonant network 20 and a primary of a transformer. The secondary 6 of the transformer generates an alternating current at a high frequency on the load circuit 3. As described below the frequency of the HFAC circuit can be varied in the range 50 kHz to 120 kHz. The system can provide power of up to 1 kW at 0.1-3 A and voltages from zero to 450V AC. Although this is described in conjunction with an input of 200-400V a low voltage version could equally be used with an input of 10-200V.

Prior art HFAC systems have an optimal operating output current. However, when conditions vary, such as varying loads, causing changes in output current, or distorted output waveforms, or the emergence of standing waves the output current on the HFAC bus and the current monitored by the power supply may will vary resulting in sub-optimal operating conditions. In this novel HFAC system elements of the power circuit can be varied such that the load circuit continues operating at the desired, and optimal current and frequency at all output load and cable length conditions. This also ensures that the alternating current is a pure sinusoidal wave. Different elements of the power circuit can be varied to adjust the performance of the HFAC output: the output voltage of the DC to DC converter (to adjust the current), the frequency of the DC to AC converter (to adjust the output frequency of the HFAC distribution bus in response to a change in load or current on the bus) and the duty cycle of the DC to AC converter (to reduce power consumption in standby conditions). The current on the load circuit is detected by the load detector and this is used as an input to determine how the different elements of the power circuit are controlled. Although the current is often used, the voltage could alternatively be determined and used as an input to the controller. The different elements of the power circuit (the output voltage of the DC to DC converter and the frequency the DC to AC converter) can also be adjusted to optimise the efficiency of the system. Hall sensors are used on the input to the power supply and the output of the DC DC, and the output of the HFAC distribution bus, (these sensors capture current consumption), this data is sent to the DSP with voltage measurements from the input and output of each circuit. The DSP can therefore always calculate the overall efficiency of the system. The DSP memory will contain mode of operation data to apply the best output current and frequency for any given load condition. This data may be in the form of a look up table that reads information from an efficiency curve held within the memory. The memory may also be an external EEPROM.

Figure 4:
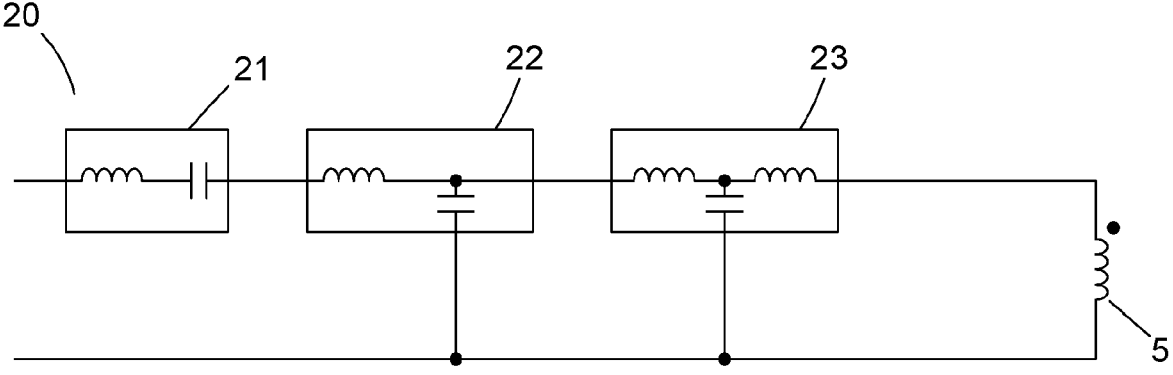
FIG. 4 depicts a resonant network according to an embodiment of the invention.

FIG. 4 depicts the resonant network 20. The resonant network comprises a first resonant tank 21 which has a first resonant frequency and comprises an LC filter which outputs a low impedance filtered waveform.

Figure 9A:
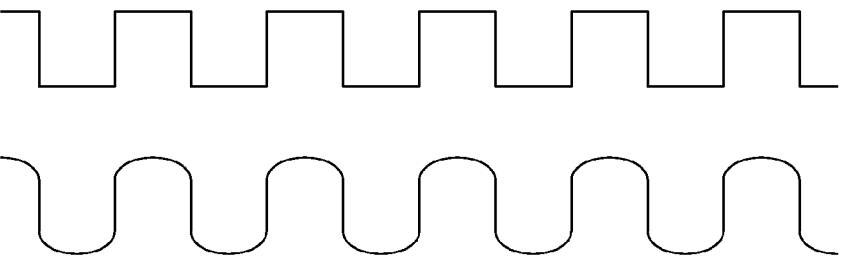
FIG. 9A depicts waveforms output from components of the system.

FIG. 9A depicts the square waveform output from the DC to AC converter and the output voltage from the first resonant tank 21. As can be seen, the waveform is soft edged or smoothed to facilitate cleaner sine waves at harmonics of the resonant frequency of the first and second resonant tanks.

Example values for the inductor and capacitor of the first resonant tank are 36 µH and 108 nF respectively. These give a first resonant frequency of 81 kHz. However, these values are merely illustrative and alternative inductive and capacitive values can be used, resulting in a different first resonant frequency.

At frequencies above the first resonant frequency the first resonant tank is inductive, and the voltage leads the current by 90° ($\pi/2$). At frequencies below the first resonant frequency the first resonant tank is capacitive, and the current leads the voltage by 90° ($\pi/2$).

The resonant network comprises a second resonant tank 22 which is formed by a parallel LC circuit 22. The second resonant tank when fed at the resonant frequency has a reflected load voltage equal to the source voltage using 1st and 2nd harmonic approximations and the capacitor is chosen to resonate with the inductor at 81 kHz in this example. This resonant tank determines the primary set point for the HFAC initial output current setting. The second resonant tank functions in reverse of the first resonant tank in that it is inductive below resonance and capacitive above resonance. Thus, the phase difference introduced by the first resonant tank is reversed. So, if the frequency is above the resonant frequency the current leads the voltage by 90° ($\pi/2$) when output from the second resonant tank (in contrast to the voltage leading the current when output from the first resonant tank). If the frequency is below the resonant frequency the voltage leads the current by 90° ($\pi/2$) when output from the second resonant tank (in contrast to the current leading the voltage when output from the first resonant tank).

Figure 9B:
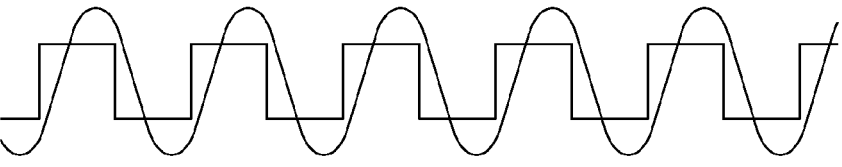
FIG. 9B depicts another example waveform output from components of the system.

FIG. 9b depicts the waveform output from the second resonant tank 22 of the resonant network, against the square wave output from the DC to AC circuit. As can be seen the waveform forms a sine wave.

The second resonant tank 22 has a second resonant frequency which is the same as the first resonant frequency. So, in the example above the second resonant frequency is 81 kHz. However, if the first resonant frequency is 100 kHz the second resonant frequency would be 100 kHz. In the 81 kHz example, inductance and capacitance values are 48 nF and 81 µH The HFAC output transformer turns ratio is determined by the HFAC output current and voltage and in HFAC systems such as this the transformer inductances are generally low, making them harder to drive efficiently. Losses from the transformer known as parasitics, are caused by ringing between the transformer windings, dielectric losses, core loss and parasitic noise due to harmonics and resistive losses.

The inventors have realised that driving the primary winding of the transformer directly from the output of the second resonant tank results in higher primary current due to these parasitic losses, consequently this excess dissipation causes efficiency losses. In order to reduce these losses and improve efficiency, additional inductance is required in series with the output of the second resonant tank and the primary winding of the transformer while introducing a phase shift whereby the current leads the voltage just above resonance (81 kHz in this example). The third stage in this resonant network serves to achieve this. The first part of the third resonant tank has a resonance which is the same as the second tank. The first part of the third resonant tank comprises a parallel LC circuit, which has a matching resonance to the second resonant tank. It maintains the same phase shift as the second resonant tank a 90 degree ($\pi/2$) phase shift which is the same as the first resonant tank. If the frequency is above the resonant frequency the current leads the voltage by 90° (π/2). At frequencies below the resonant frequency the voltage leads the current by 90° (π/2). In this example the inductance is 81 µH and the capacitance is 48 nF.

Figure 9C:
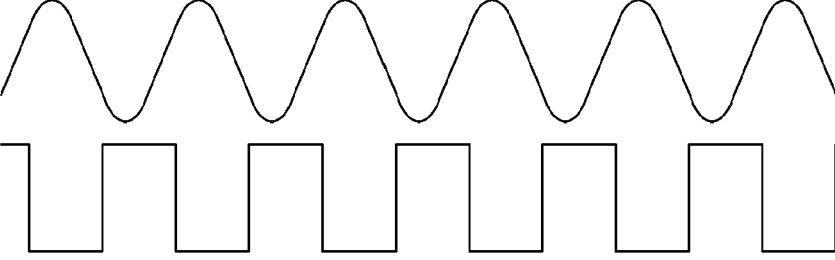
FIG. 9C depicts another example waveform output from components of the system.

The second part of the third resonant tank is an additional series inductor with an inductance value slightly less than half that of the inductor in the first part of the third resonant tank. The additional series inductor (which, in this example, has a value of 36 nH) connected in series with the transformer serves to add the final inductance required to a) further reduce the losses due to the parasitics previously mentioned, b) act as a current limit. The series inductor ensures that the voltage leads the current by 90° (π/2) at all frequencies. The series inductor serves to balances the current between the primary winding circuit and the reso-nant network, in a similar way as a current limit. In this example, a 36 nH inductor driven at 81 kHz from a 360 VDC bus will provide an output current of 2.1 A. As the series inductor serves to limit the current into the transformer it therefore has the same effect on the secondary side. For example, using the same example as above whereby a 36 nH inductor provided 2.1 A on the output, a 18 µH inductor would limit the current to circa 1.8 A, whereas a 54 nH inductor would limit the current to circa 2.3 A. FIG. 9C depicts the output waveform from the third resonant tank compared to the square wave input to the resonant network.

This three element resonant network provides clean stable sine waves to the primary of the transformer under all load and cable length conditions, whereby the secondary output is in phase with the primary.

Figure 5:
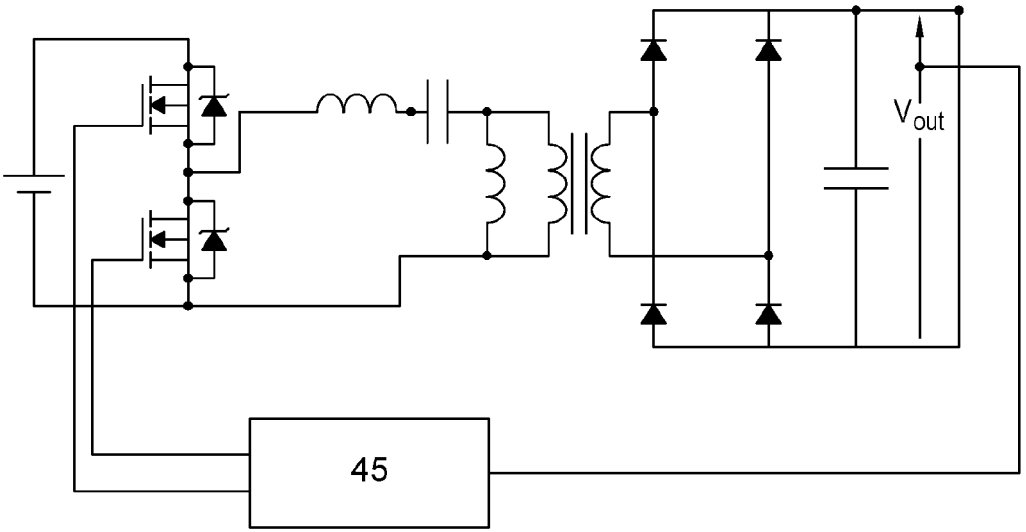
FIG. 5 depicts a DC to DC circuit according to the invention.

FIG. 5 depicts the DC to DC converter which, in this example is a half bridge LLC resonant bridge circuit. The controller controls the output of the DC to DC converter in response to the load circuit detector, as described below. The DC to DC converter may comprise a controller, or it may be controlled by the main system controller. To change the voltage output of the DC to DC converter the controller adjusts the pulse width of the to the transistors.

Although the DC to DC converter in this example is an LLC resonant bridge circuit it could also be a buck boost, a push pull or a cuk converter.

Figure 6A:
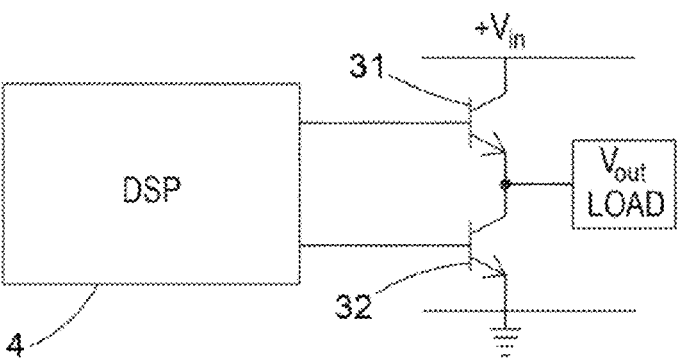
FIG. 6A depicts a half bridge according to an embodiment of the invention.

FIG. 6A depicts a half bridge circuit which converts the DC voltage into an AC current. As can be seen, there are two switching elements 31, 32 which are, in the present embodi-ment, transistors. The timings for the transistors are con-trolled by a synchronisation pulse generated by the DSP 4. The synchronisation pulse switches the different transistors on and off to generate an alternating current through the output. If the synchronisation pulse increases the transistors will be switched at a greater frequency and the output frequency, and therefore also the frequency on the load circuit (the HFAC frequency), increased.

The DSP can therefore control the HFAC frequency. This may be via an interface with the DSP, either wirelessly or on site. The frequency may also be adjusted to control the power transmitted. If an increased load is detected on the load circuit, by detecting a decrease in the output voltage or current, or an increase in output power, the frequency is increased. If a decreased load is detected the frequency is decreased.

The synchronisation signal includes not just a clock signal but on and off times for each of the transistors. Therefore, in addition to controlling the output frequency, the DSP also controls the dead time (or pulse width modulation) of the half bridge circuit. This may be in response to the frequency changing but it may also be in response to a change in the current on the load circuit which has resulted in the DC voltage from the PFC changing. If the DC voltage increases (in response to the current on the frequency and load circuit changing) the dead time of the half bridge may be increased. An improper dead time can create shoot-through and short the supply to ground, increasing losses in the bridge FETS and which can decreasing efficiency. The fast Half-Bridge has controllable dead time to keep the efficiency high. Increasing the switching frequency helps reduce the size of the semiconductors and magnetic components, but increases the overall amount of time spent with both FETs turned off if the dead time does not decrease as a percentage of the switching frequency.

Conversely, if the DC voltage decreases the dead time of the half bridge may be decreased to keep the circuit as efficient as possible. The load detector 7 detects the voltage, or load on the load circuit and the DSP adjusts the synchro-nisation signal to adjust the dead time of the half bridge accordingly.

The automatic clock frequency and deadtime control offer extremely high levels of efficiency under all load conditions and stability of the HFAC sine wave as the load increases or decreases under both short and long cable lengths.

The synchronisation can also be used to facilitate on-the-fly synchronisation across multiple power supplies. For this the synchronisation pulse would be used across multiple power supplies.

Figure 6B:
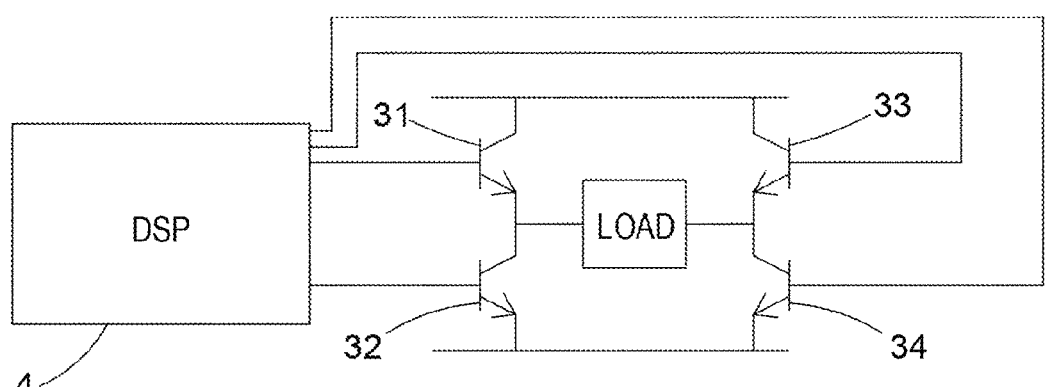
FIG. 6B depicts a full bridge according to an embodiment of the invention.

FIG. 6B depicts a full bridge circuit which can be used as an alternative to the half bridge depicted in FIG. 6A. The full bridge comprises four switching elements 31, 32, 33, 34. In an alternative embodiment both a full and half bridge can be present with the full bridge being used at high power (for example above 500 W) and the half bridge being used at low power (for example up to 500 W).

The load detector may detect a plurality of electrical parameters of the load circuit. Although the current can be detected and used as an input for the DSP, the voltage or power of the load circuit could also be used as an alternative input for the DSP. The load detector 7 may also detect the total harmonic distortion (THD) of the output waveform on the load circuit. The THD of the output waveform indicates the level of noise in the electrical signal. The total harmonic distortion may also be used as an input for the DSP to adjust the characteristics of the power circuit.

Through the detection of total harmonic distortion/noise, standing waves can be detected and the controller can adjust elements of the power circuit to reduce and eliminate undesirable standing waves.

It is through control of noise and standing waves that side by side wires, rather than twisted wires can be used. The use of side-by-side wires rather than twisted wires facilitates a considerably simpler-to-use system.

Figure 7:
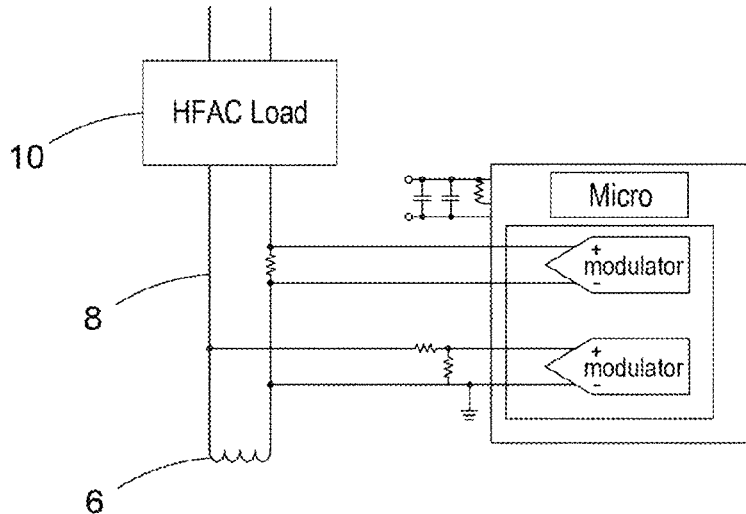
FIG. 7 depicts a power detector.

The load detector 7 may be any detector capable of detecting one or more of the current, load, power and THD of the load circuit. An illustrative load detector is depicted in FIG. 7.

The controller operates to maintain the load circuit at a constant current, or within a predetermined range of current values. For example, the controller may control the system to maintain the current on the load circuit at 1.5 A, or within a range of 1.5-2.5 A. The current on the load circuit is controlled, even when the load is varied, by varying and controlling the output of the DC to DC circuit. If the load on the load circuit is increased, indicated by a reduced current, the output of the DC to DC circuit is increased by the controller. Conversely, if the load on the load circuit is decreased, indicated by an increased current, the output of the DC to DC circuit is decreased by the controller.

The controller may also, or additionally, operate to control the frequency of the load circuit. This can be controlled and varied by varying the switching frequency of the DC to AC converter 30. In response to a reduced load (indicated by an increased current) on the load circuit the frequency of the DC to AC converter is increased and the DC to DC output voltage is also decreased. In response to an increased load on the load circuit the frequency of the DC to AC converter is decreased and the output of the DC to DC output is increased. One application of controlling the frequency to maximize the efficiency, or Q factor, of the system as a whole. A detector may be used to detect the electrical parameters of the input to the system as a whole. For example, the input power may be detected. This then allows the efficiency of the system to be detected. For each load on the load circuit and input power the controller may have a look up table to determine the optimum switching frequency and DC to DC output. The resonant frequency of the resonant network may be used to maximize the efficiency of the system.

As described above, for an AC input to the inverter a PFC 9 is used. This preferably has a variable output and, in response to a detected change in the current and or power delivered to the DC DC circuit, the output of the PFC may be adjusted by the controller. The controller will control the PFC to maintain an output between 380-440V (and an input to the DC to DC circuit) to ensure that the operating modes within the PFC are correctly set by the DSP for optimal efficiency. The operating modes shift between CCM (Continuous Conduction Mode) at high loads, CRM (Critical Conduction Mode) at medium to low loads and Burst mode for very light loads or standby.

The load detector may also detect standing waves on the load circuit. In response to detected standing waves the frequency may be adjusted to avoid standing waves at operation below, at or above resonance.

Although FIGS. 5 and 6 each depict different elements of the power circuit which can be adjusted independently each element described in conjunction with FIGS. 5 and 6 can be adjusted in combination the others. For example the switching frequency of the DC to AC converter can be adjusted in combination with the output voltage from the DC to DC converter.

To ensure that the temperature of the system remains within safe limits, there may also be one or more temperature sensors arranged on or around the system. These can be connected to the DSP either wirelessly or via a wired connection, but in the preferred embodiment are built into the power supply. The temperature sensors may include an internal ambient temperature sensor, an external ambient temperature sensor, a PFC power stage temperature sensor, an output stage temperature sensor, a transformer temperature sensor and/or resonant inductor temperature sensors. Each of these temperatures may be recorded over time and for each power load so can be used as a reference. As the operating conditions of different power systems will be different, the system may use the past data (for example using artificial intelligence) to set a normal operating temperature range for the system. This can provide an early warning to a user: for example, if the temperature is outside a predetermined range the user may be alerted. In addition to, or as an alternative to a user alert the system may also adjust the system to ensure that the temperature remains within safe limits. For example, if the system is overheating it may reduce the power transmitted to the load circuit. This may be achieved by reducing the operating frequency (by adjusting the synchronisation pulse as described in conjunction with FIG. 6), or by adjusting the output voltage of the DC to DC circuit. Thus the system reduces the power to avoid the system overheating and breaking down and provides predictive failure alerts.

As described above, the load detector 7 may comprise a power sensor to measure the power on the load circuit. This can be used as a safety feature to prevent the system operating outside safe limits. A given system will have a given operating range, for example up to 400 W. If the detected power is greater than this range the user may receive an alert. The user could then either reduce the number of peripheral devices on the system or the system could reduce the power transmitted to the load circuit (by the methods described above) such that, for example the lights are made dimmer. Alternatively or additionally to alerting the user, the DSP may automatically reduce the power transmitted to the load circuit.

The power sensor may also be used as a control for the system. As described above, a user may specify a particular power. For example, a user may wish that there is greater power during the day (for brighter lights) and less power at night, or vice versa. The system can adjust the power supplied by using any of the ways described above such that the power is at a specified value, or within a specified range, which can be measured by the power sensor.

The system provides a method of anticipating and predicting when failure may occur. The system may monitor the current, power, frequency or temperature. For each of these variables there may be an operational range. Alternatively or additional, the system may record the values over time to be used as a reference. If one of these values is out of the operational range, or out of the usual range the controller may transmit an alert to a user. The user can therefore reduce the power of the system, switch it off or take any other necessary action. Alternatively or additionally to a user alert the controller may control features of the system to reduce the power and/or current to avoid catastrophic failure.

When not in active use (i.e. no peripheral devices) the system may be put into a sleep mode to conserve power. In a sleep mode the operating frequency would be increased to a value between 50 kHz and 120 kHz. The load detector may detect (either by detecting the current or the power) that there are no loads on the power bus and the controller 4 may then put the system into a sleep mode by a variety of power saving modes including disabling the system.

Due to the improved control of the current and power in the load circuit the system is much more efficient. Power is not lost when there is no load as the circuit can automatically adjust. Various levels of sleep modes from standby, sleep and deep sleep enable further efficiency and power savings to be made.

Figure 8:
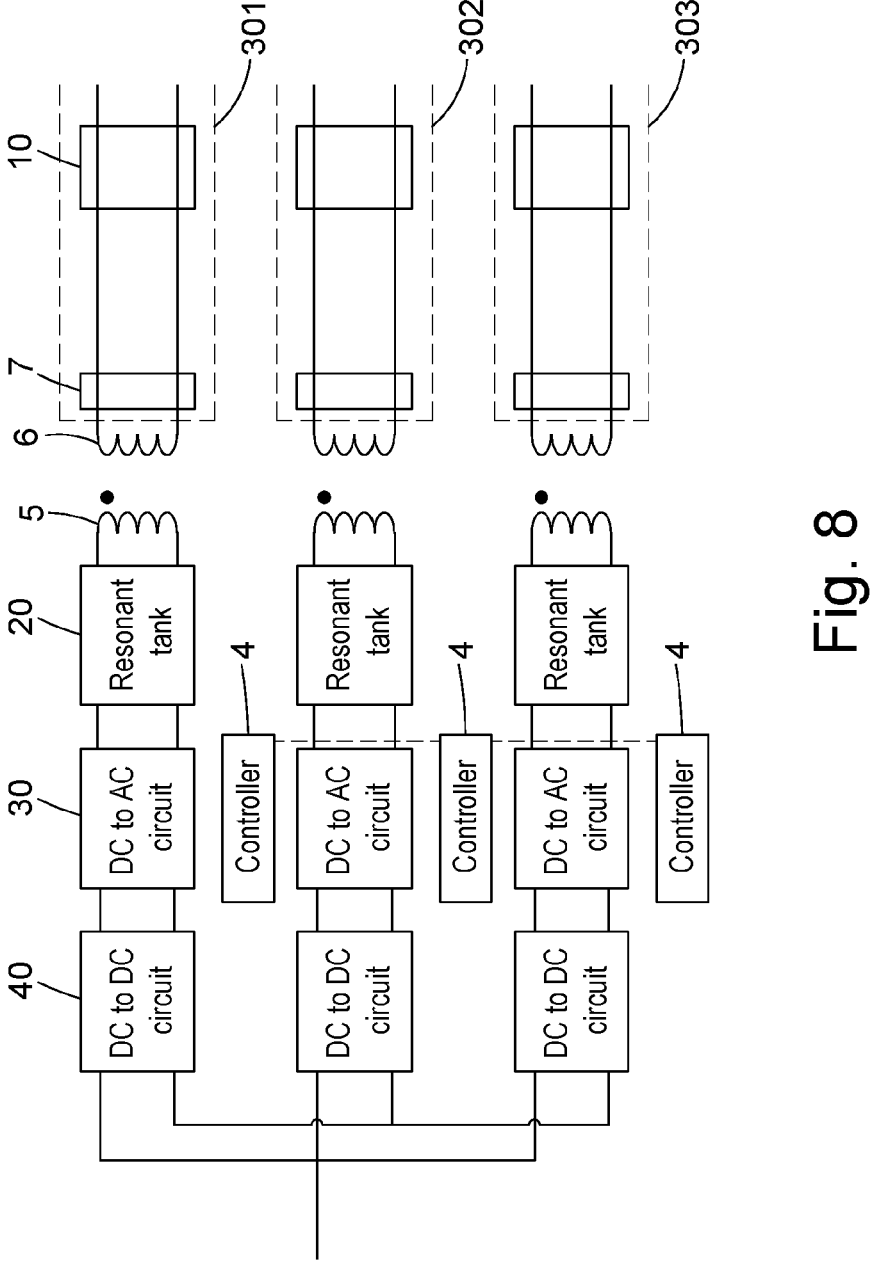
FIG. 8 depicts a power distribution system with a plurality of load circuits.

FIG. 8 depicts a power distribution system with a plurality of load circuits 301 302, 303. As can be seen, for each load circuit there is a separate DC to AC converter 30, resonant tank 20 and primary inductor 5. Each load circuit has a controller 4 and a load detector 6 to detect the load on the individual circuit. The variables of the PFC circuit and the different DC to AC converters and resonant tanks are controlled by the respective controller 4. As each load circuit may have different loads, the power transmitted to each load circuit can be individually controlled and each load circuit can operate at a different frequency. However, when there are a plurality of load circuits it is desirable to synchronise the frequencies across the different load circuits so a synchronisation signal can be transmitted between the controllers of the different load circuits. As an alternative to different controllers for different load circuits a single controller could be used.

Parameters

In the load circuit various parameters are detected; input and output voltage, input and output power, input and output current, resonant tank voltage, temperature, power factor correction voltage and periodic and random deviation. Based upon these monitoring functions, the controller adjusts the HFAC power supplies output in real time, adjusting output frequency, resonant capacitance and frequency, and output current to maintain the highest possible efficiency at all load conditions and output waveform signal integrity. Thus the frequency, voltage, current and power limit of the AC current can be adjusted and hence also the frequency of the power bus can be adjusted and controlled by the controller.

The table below indicates some of the different variables which may be detected, together with the features which may be adjusted and the resulting effects.

| Variable | Adjust | Effect |
| --- | --- | --- |
| HFAC output current | DC to DC output voltage | Adjusts load circuit current and voltage |
| Load circuit frequency | Synchronisation pulse which adjusts half bridge clock or pulse width modulation | HFAC output frequency |
| Temperature | Switching elements in PFC, bridge, Resonant Tank, Output Transformer and ambient | Controlled shutdown of system. Auto restart. |
| Resonant tank | Resonant tank Q Factor. Measure resonance peak before system start am Nd adjust DSP controlled bridge frequency to at or just above resonance | Load circuit current and noise control |

Furthermore, the software is able to detect standing wave problems should they arise for any reason and take appropriate action to eliminate them, by adjusting the frequency of operation relative to the Q factor of the resonant tank to operating frequency, PFC voltage, PFC operating mode, or a combination thereof.

Prior to being switched on, or operation, the controller may directly (i.e. not through the transformer) transmit a pulse along the load bus. Using reflectometry, the controller can detect the length of the output cable and also check that there is a secure connection at both ends. The length of the cable (either detected using this method or by another) can be used in determining the optimum frequency and optimum DC to DC output. For example, a longer cable is likely to require a reduction of frequency from a shorter cable which in turn may require adjustments in the output from the DC DC circuit to maintain the required output current. Cable length versus operating current and frequency are held in a look up table for the DSP to access and set the appropriate settings. Furthermore, the reflectometry test can determine a damaged or poorly fitted cable and inhibit start up. A warning may be issued to the user.

In addition, within the preferred embodiment, the HFAC power supply may be configured by a user to conform to separated or safety extra-low voltage (SELV) requirements, whereby the HFAC power supply will modify its output current and power capabilities to maintain operation to SELV requirements on the HFAC output power bus. This innovative mode of operation and the low voltages produced may facilitate compliance with extra low voltage standards such as SELV, further facilitating safe and user-friendly installations, without the need for specialised installers or qualified electricians.

With the use of SELV then even in jurisdictions with legal restrictions on domestic power supplies a householder will be able to manage a DIY electrical installation. When coupled with inductively connected loads this provides a system that is spark and arc free even in fault conditions.

The present invention provides a waterproof power transmission system due to the wireless power transmission. Thus it can be used in and around pools, boats, waterways and the sea.

The preferred embodiment is designed to be implemented for powering HFAC powered wireless power transmitters, facilitating the wireless charging of wearable and other low power devices, ear pods, watches, game controllers, fitness bands, health monitors etc up to 20 feet away from the power supply and installed loads. It is envisaged within the preferred invention, HFAC distribution also enables the use of HFAC powered Li-Fi enabled devices, particularly advantageous as the HFAC output cables can now extend greater than 400 m cable length with no standing wave issues.

It is envisaged the preferred invention will over time power many common items, with everyday items being powered by HFAC as opposed to mains AC power. This will enable many everyday products to realise the safety HFAC provides. Due to the high Power Factor of the HFAC output everyday products such as televisions may use new power architecture, eliminating the traditional use of Power Factor Correction, further saving product build cost; as the efficiency is therefore inherently higher, further costs may be realised in the reduction of consumer utility bills and a reduction of the power generated further reducing greenhouse gasses.

The system is also compatible with, and can be controlled by, a smart home device such as Alexa or Google home. Thus a user can control the lighting by giving instructions to the smart home device.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

What is claimed is:

1. A high frequency AC inverter comprising a DC-DC circuit, an output power circuit, a load circuit, and a controller, the load circuit comprising a load circuit detector configured to detect the electrical parameters of the load circuit, the output power circuit comprising:

a DC to AC driver having a variable frequency output;

a HFAC driver circuit comprising a resonant network; and a transformer coupled to the HFAC driver circuit and the load circuit, wherein the controller is configured to control the output frequency of the DC to AC driver and the output of the DC to DC circuit in response to the detected electrical parameters of the load circuit;

wherein controlling the output frequency of the DC to AC driver in response to the detected electrical parameters of the load circuit comprises, in response to a detected reduced load on the load circuit, increasing the frequency output of the DC to AC driver and decreasing the DC to DC output and, in response to a detected increased load on the load circuit, reducing the frequency output of the DC to AC driver and increasing the DC to DC output.

2. A high frequency AC inverter according to claim 1 further comprising an input detector configured to detect the electrical parameters of the input to the high frequency AC inverter.

3. A high frequency AC inverter according to claim 1 wherein controlling the output frequency of the DC to AC driver and the output of the DC to DC converter comprises determining the optimum frequency and optimum DC to DC output for maximum efficiency for the detected load and controlling the frequency output of the DC to AC driver and the output of the DC to DC circuit according to the optimum frequency and optimum DC to DC output.

4. A high frequency AC inverter according to claim 3 wherein optimum frequency and the optimum DC to DC output for maximum efficiency are stored in a look up table in the controller.

5. A high frequency AC inverter according to claim 1 wherein controlling the output frequency of the DC to AC driver and the output of the DC to DC circuit is based on the point of resonance of the resonant network.

6. A high frequency AC inverter according to claim 1 wherein the controlling the output frequency of the DC to AC driver and the output of the DC to DC circuit is based on the length of the load circuit.

7. A high frequency AC inverter according to claim 1 wherein the controlling the output frequency of the DC to AC driver comprises detecting standing waves from the electrical parameters of the load circuit and adjusting the frequency.

8. A power supply according to claim 1, wherein detecting the electrical signal of the load circuit comprises detecting one or more of the voltage of the load circuit, the current of the load circuit, the frequency of the load circuit the power of the load circuit or the distortion of the load circuit.

9. A high frequency AC inverter according to claim 1 wherein the controller comprises a digital signal processor.

10. A high frequency AC inverter according to claim 1 wherein the load circuit comprises a pair of side-by-side wires.

11. A high frequency AC inverter according to claim 1 wherein load circuit has a variable frequency of 10 kHz to 150 kHz.

12. A high frequency AC inverter according to claim 1 wherein the input frequency of the power circuit is between 10 Hz and 500 Hz.

13. A high frequency AC inverter according to claim 1 wherein the load circuit is controlled to within safety extra low voltage standards.

14. A high frequency AC inverter according to claim 1 wherein the controller is controllable through RF, encrypted RF, Bluetooth or WiFi devices.

15. A high frequency AC inverter according to claim 1 further comprising one or more peripheral devices inductively coupled to the load circuit, and powered by the high frequency AC power supply.

16. A high frequency AC inverter according to claim 1 wherein the resonant network comprises a first resonant tank, a second resonant tank and a third resonant tank, the first resonant tank comprising a series LC circuit and having a first resonant frequency, the second resonant tank comprising a parallel LC circuit and having a second resonant frequency, the third resonant tank having a first part comprising a parallel LC circuit having a third resonant frequency and a second part comprising a series inductor, wherein the first resonant frequency, the second resonant frequency and the third resonant frequency are substantially the same.

17. A high frequency AC inverter according to claim 16 wherein the controller is configured to keep the load circuit within a current range of 1.5-2.5 A.

18. A high frequency AC inverter according to claim 1 wherein the controller is configured to control the output of the DC to DC circuit to control the current on the load circuit to maintain it within a predetermined range.

19. A high frequency AC inverter according to claim 18 wherein the controller is configured to increase the variable output of the DC to DC circuit in response to a detected increased load on the load circuit and to decrease the output of the DC to DC circuit in response to a detected reduced load on the load circuit.

20. A high frequency AC inverter according to claim 1 wherein the controller determines the length of the load circuit and determines the output of the DC to DC circuit in response to the length of the load circuit.

*    *    *    *    *